United States Patent
Libhart (12) 
(10) Patent No.: US 6,371,565 B1
(45) Date of Patent: Apr. 16, 2002

(54) HIGH-LIFT LATERAL DUMP SYSTEM FOR PAVEMENT/STREET SWEEPERS

(75) Inventor: Anthony C. Libhart, Huntsville, AL (US)

(73) Assignee: Schwarze Industries, Inc., Huntsville, AL (US)

( * ) Notice: Subject to any disclaimer, the term of this patent is extended or adjusted under 35 U.S.C. 154(b) by 0 days.

(21) Appl. No.: 09/580,949

(22) Filed: May 30, 2000

(51) Int. Cl.⁷ .................................................. B60P 1/34
(52) U.S. Cl. .......................... 298/11; 298/17 SG; 15/83; 414/700
(58) Field of Search ...................... 298/11, 17 S, 17 SG; 15/83, 78, 340.3; 414/501, 700, 708

(56) References Cited

U.S. PATENT DOCUMENTS

| | | | |
|---|---|---|---|
| 3,162,877 A | * 12/1964 | Schmidt et al. | |
| 3,293,679 A | 12/1966 | Murphy | |
| 3,312,992 A | * 4/1967 | Schmidt et al. | 298/11 |
| 4,173,052 A | 11/1979 | Burgoon et al. | |
| 4,193,159 A | 3/1980 | Beard | |
| 4,236,756 A | 12/1980 | Hildebrand | |
| 4,327,945 A | * 5/1982 | Fowler | 298/11 |
| 4,363,151 A | * 12/1982 | Knowlton | 298/11 X |
| 4,608,725 A | 9/1986 | Jackson | |
| 5,027,464 A | * 7/1991 | Knowlton | 298/11 X |
| 5,054,152 A | 10/1991 | Hulicsko | |
| 5,064,248 A | * 11/1991 | Tegtmeier | 298/11 |
| 5,072,485 A | 12/1991 | Young et al. | |
| 5,251,652 A | 10/1993 | Strauser | |
| 5,447,094 A | * 9/1995 | Geyler, Jr. | 414/700 X |
| 5,609,464 A | * 3/1997 | Moffitt et al. | 414/700 X |
| 5,797,203 A | * 8/1998 | Vanderlinden | 15/78 X |
| 5,938,394 A | * 8/1999 | Christenson | 414/501 X |

* cited by examiner

Primary Examiner—Stephen T. Gordon
(74) Attorney, Agent, or Firm—Wallace G. Walter (57) ABSTRACT

A high-lift lateral dump system for pavement/street sweepers (20) includes a debris container (30) positioned between laterally adjacent lift assemblies (40R, 40F), each lift assembly (40R, 40F) including a vertically extending upright (42), a lift arm (44) that is pivoted at one end to upper end of the upright (42), and a single-ended double-acting hydraulic lift cylinder (46) that functions to raise and lower the lift arm (44). A torque control mechanism (48) minimizes misphasing between the lift cylinders (46) of each lift assembly (40R, 40F), and a manual safety stop mechanism (50) allows an operator to selectively lock the debris container (30) and the related structural components in the lifted position. An attitude-control system uses hydraulic fluid from the rod end (46r) of the lift cylinder (46) to maintain the debris container (30) in a horizontal or near horizontal attitude during the lift cycle.

19 Claims, 9 Drawing Sheets

HIGH-LIFT LATERAL DUMP SYSTEM FOR PAVEMENT/STREET SWEEPERS

BACKGROUND OF THE INVENTION

The present invention relates to a high-lift lateral dump system for pavement/street sweepers and, more particularly, to a lateral dump system that is simple in design and operationally efficient.

Various types of vehicles have been developed to sweep or vacuum debris from pavements, roadways, and streets. In general, these vehicles use a motor driven fan to create a high-velocity air flow to effectively vacuum or aspirate the debris from the pavement or street surface. In a typical vacuum system, a motor-driven fan develops a high-volume, high-velocity recirculating air-flow through an intake hood that is mounted closely adjacent the pavement surface. A gutter broom is often mounted adjacent to each lateral side of the vacuum hood to brush debris into the path of the intake hood. As the intake hood is moved along the pavement surface, debris is aspirated into the air flow and carried by ducting into and through a debris-collecting hopper or container. The velocity of the air flow is reduced in the debris container so that entrained particles "drop-out" of the air flow and are collected in the debris container. When the debris container has reached capacity, the container is emptied and the sweeping/vacuum operation is resumed.

From a conceptual standpoint, different design themes have been developed relating to the issue of debris off-loading. These design themes include belly-dump systems, various types of end-dump or side-dump systems, and high-dump systems.

In the belly-dump system, doors or hatches are provided on the underside of the debris container so that, when opened, the debris is directly dumped from the vehicle. In a typical scenario, the sweeper is driven to an area specially designated for receiving the debris removed from the roadway or pavement.

In side-dump systems, the doors or hatches of the debris-container are located on a lateral side thereof and the debris container is mounted so that it can be tilted to dump the debris from the debris container. In some systems, the debris is dumped from the rear of the vehicle while, in other systems, the debris is dumped from one lateral side or the other.

The high-dump systems can be viewed as a variation of the lateral dump system in that the debris container is first lifted or elevated above its initial position and then tilted to dump the debris through the container doors. In some high-dump systems, the debris container is lifted over the vehicle cab so that the debris is off-loaded from the forward end of the vehicle, in other systems the debris container is lifted above the rear end of the vehicle, and, in lateral high-dump systems, the debris container is lifted upwardly and over the side of the vehicle to effect lateral dumping.

Lateral high-dump systems are particularly useful in the highway sweeping context in which the time-efficient off-loading of debris into a conventional dump truck is considered important. In this context, a sweeping vehicle will sweep debris until its debris container is full. At that time, a conventional dump truck will position itself in a side-to-side relationship with the sweeping vehicle. The debris container will be elevated above the upper edge of the dump truck and thereafter tilted to dump its load into the bed of the dump truck. A lateral high-dump arrangement allows relatively quick off-loading of the debris and minimizes opportunities for motor vehicle accidents when sweeping highways.

In the lateral high-dump context, it is considered important that all or almost all the debris be transferred from the debris container into the dump truck with a minimum of spillage onto the road surface. To this end, it is considered acceptable to laterally shift the debris container toward the dump truck during the dump cycle.

One company, Elgin Sweeper Co. of Elgin Ill., has designed a high-dump system that employs a fork-lift type mast that is used to elevate the debris container, as disclosed in U.S. Pat. No. 5,251,652. In addition, Elgin Sweeper also markets a high-dump system under the AirBear tradename that uses a hydraulically driven multi-link "scissor-jack" system to lift or elevate the debris container to its elevated position. A hydraulically operated slide arrangement is mounted on the top of the scissor-jack system and is used to shift the debris container laterally so that the debris container extends somewhat over the lateral edge of the vehicle and is better positioned to dump debris into the dump truck. When the debris container is in its elevated and laterally shifted position, the debris container is tilted to effect the dumping operation.

From a design standpoint, the scissor-jack system and its lateral slide must be mounted beneath the debris container; the vertical depth of the debris container must be reduced to accommodate the vertical height of the scissor/slide system that underlies the debris container. As a practical matter, the dimensions of the debris container that define its internal volume, including its vertical height, must be sufficiently large so that the velocity of the incoming air stream can slow sufficiently to allow the entrained particles to "drop out" of the air flow for collection and still allow sufficient space for the air stream to continue through the system. The need to mount the scissor/slide system beneath the debris container requires that the vertical height of the debris container be reduced to accommodate the scissor/slide system and also requires that the volume of the debris container be reduced by as much as 30% or so.

SUMMARY OF THE INVENTION

In view of the above, it is an object of the present invention, among others, to provide a high-lift lateral dump system for pavement/street sweepers that is structurally efficient.

It is another object of the present invention to provide a high-lift lateral dump system for pavement/street sweepers that maintains the debris container in a horizontal or near-horizontal attitude as the container is lifted from its lowered to its raised position.

It is still another object of the present invention to provide a high-lift lateral dump system for pavement/street sweepers that includes a torque control system that minimizes the consequences of any mis-phased operation of the hydraulic cylinders used to effect lifting.

It is a further object of the present invention to provide a high-lift lateral dump system for pavement/street sweepers having a manual safety stop locking arrangement by which the structural components of the system can be locked in a raised position to allow the safe inspection of the system while in its raised position.

It is still another object of the present invention to provide a high-lift lateral dump system for pavement/street sweepers including an efficient door-opening and closing system by which debris can be emptied from the debris container.

In view of these objects, and others, the present invention provides a high-lift lateral dump system for pavement/street sweepers, preferably of the type having the major components thereof mounted on a commercial truck chassis. In the preferred form, the system includes a debris container for receiving debris swept from the roadway or pavement surface and a lift assembly mounted on each side of the debris container for lifting the container from a lowered, cradled position to an elevated, lift position from which the debris can be dumped or off-loaded. Each lift assembly includes a vertically aligned upright secured to the vehicle frame and a lift arm pivotally connected at one end to the upright and pivotally connected, at the other end, to the debris container. A hydraulic lift cylinder is connected between each lift arm and an anchor bracket to selectively move the lift arm and the connected debris container between its lowered and lifted positions. An attitude-control hydraulic cylinder and a tilt-control hydraulic cylinder are mounted as a tandem cylinder-set on each lift arm to control the attitude of the debris container as the lift arms are moved from their lower position to their lifted positions and to also control tilting of the debris container when in its lifted position. The attitude-control hydraulic cylinder functions to maintain the debris container in a horizontal to substantially horizontal position as the debris container is lifted from the lowered position to the lifted position. The tilt-control hydraulic cylinder is selectively actuatable by an operator to further rotate the debris container about its pivotal connection with the lift arm to an inclined attitude sufficient to dump debris from the debris container when the debris container is in its lifted position.

In accordance with one feature of the invention, the attitude-control hydraulic cylinder is in fluid communication with its lift cylinder and receives a flow of pressurized fluid from its lift cylinder when the lift cylinder is moving the respective lift arm from the lowered position to the lifted position to automatically maintain the attitude of the debris container in a horizontal or near horizontal position during the lift sequence.

The system is provided with a torque-control system connecting the lift arms to one another throughout the lift cycle to accommodate any mis-phased operation of the lift cylinders. The torque control system includes a rotatably mounted and axially extending torsion bar having axially spaced torque arms. Each torque arm is connected by a respective linkage to a lift arm. The torsion bar is effective to prevent undesired twisting or torquing of the debris container in the event one lift cylinder leads or lags the other or is otherwise mis-phased during the operating cycle.

The system is provided with a manual safety stop locking feature by which the structural components can be mechanically locked in the raised or lifted position to allow an operator to inspect the system without concern as to an accidental or unintentional movement of the lift components to the lowered position. One of the linkage mechanisms that connects the torque arm of the torque control system to its respective lift arm includes a lock-pin receiving hole that co-aligns with another lock-pin receiving hole on its connected torque arm when the lift system is in its raised position. A lock pin is inserted into the co-aligned lock-pin receiving holes in order to lock the system in its lifted position.

The system also features a bi-door arrangement for the debris container which includes first and second doors and fluid-actuated door-control cylinders that selectively open and close the second door. The facing edges of the two doors are formed with a complementary 'mitered' interface so that the second door, when moved to its closed position by the door-control cylinder, also engages the first door to automatically close the first door.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
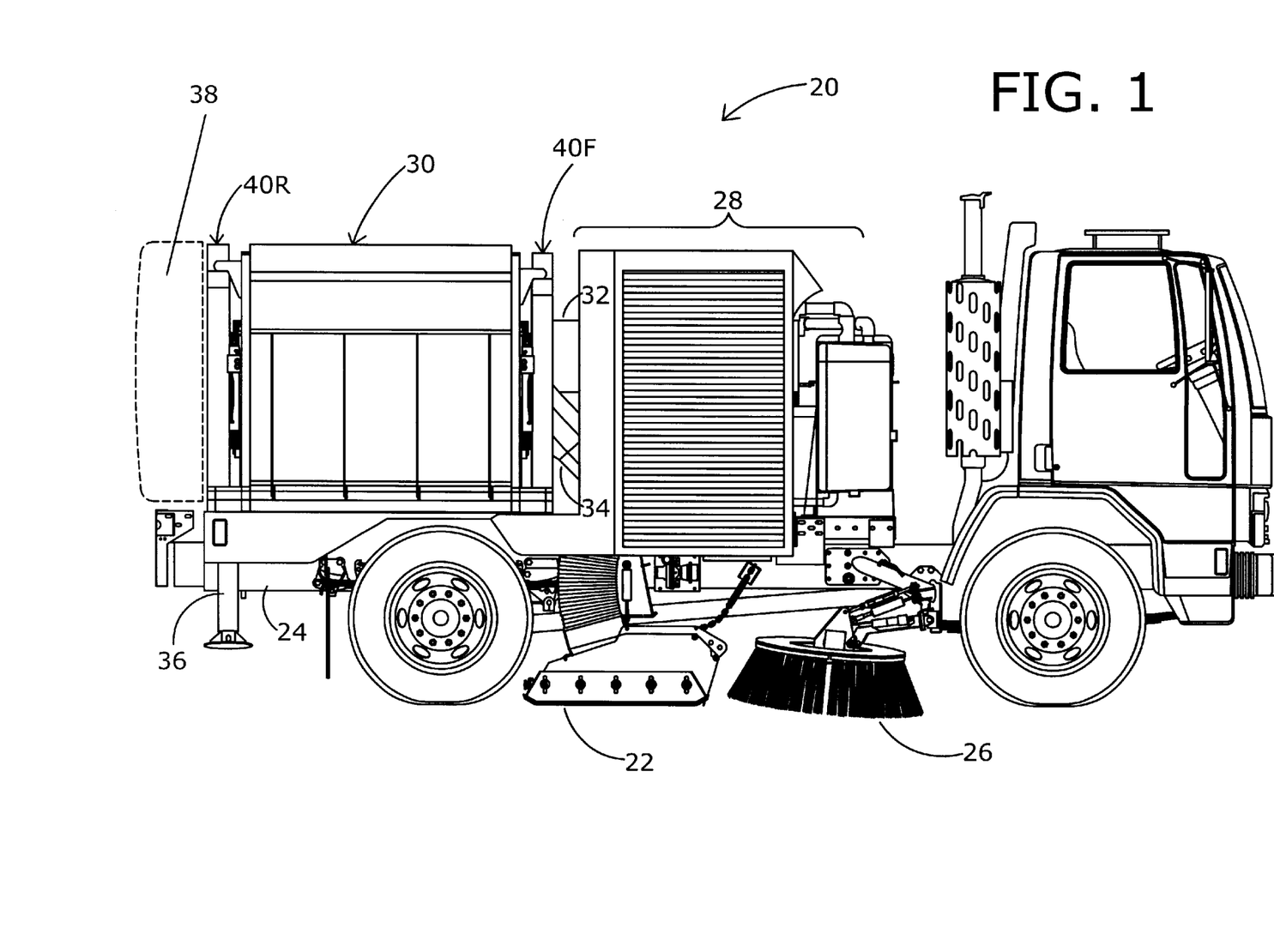
FIG. 1 is a side elevational view of a pavement/street sweeper having a high-dump system in accordance with the present invention.
Figure 2:
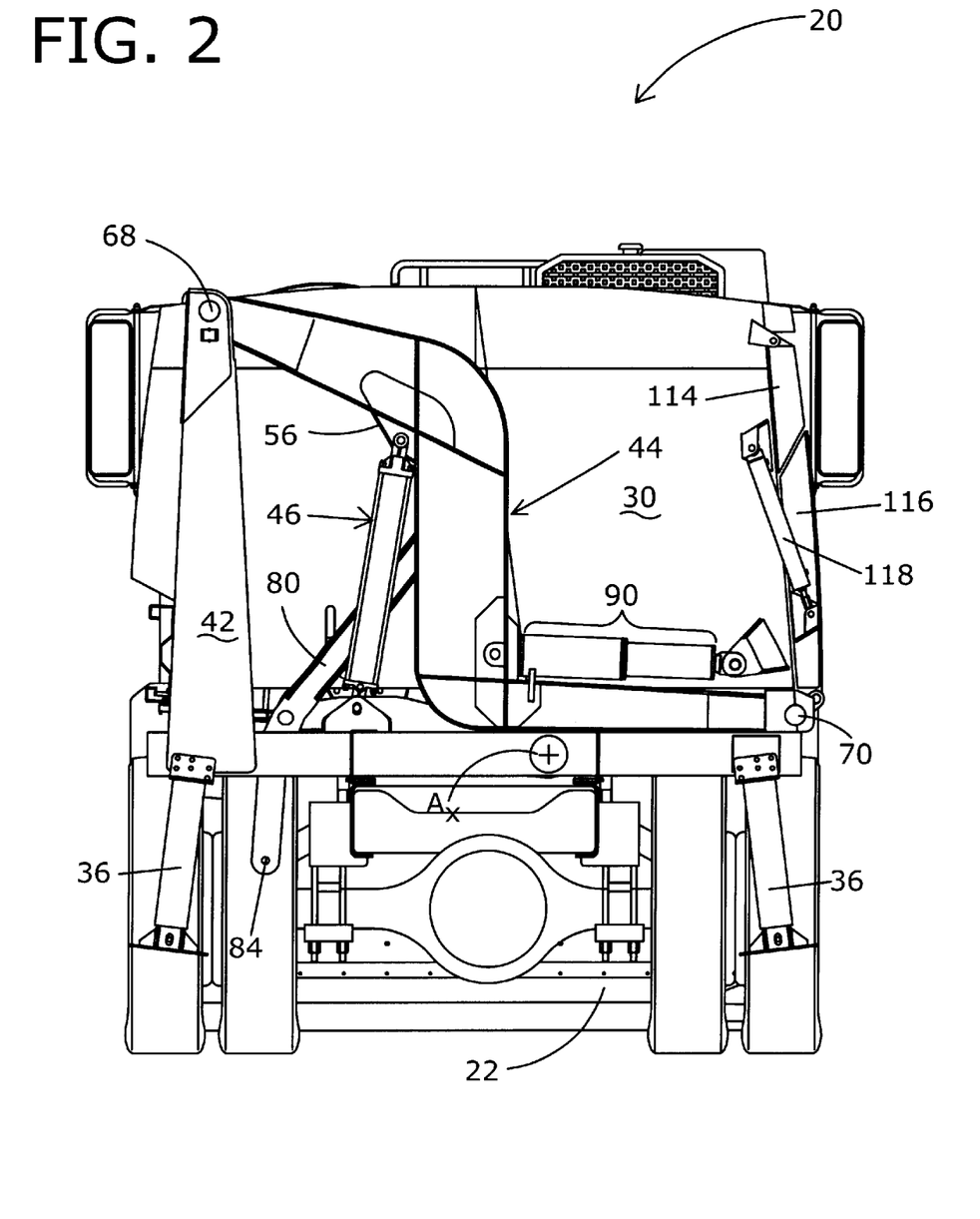
FIG. 2 is a rear view of the pavement/street sweeper of FIG. 1 with selected components removed to show portions of the high-dump system of the present invention.

A high-lift lateral dump system for pavement/street sweepers in accordance with the present invention is shown in representative form in a truck-mounted sweeper 20 in side view in FIG. 1 and in rear view in FIG. 2. The particular sweeper shown is representative of sweepers manufactured by Schwarze Industries, Inc. of Huntsville, Ala. 35811.

As shown in FIG. 1, the sweeper 20 is mounted on a commercial truck chassis and includes a debris intake hood 22 carried beneath the truck frame 24, a conventional gutter broom 26 that is mounted forwardly of the debris intake hood 22 on each side thereof, and a power unit 28 that includes (not specifically shown) a high-volume, high-velocity radial flow fan, an internal combustion engine for driving the fan and associated hydraulic pumps, and various accessory and related equipment as is known in the art. The radial flow fan may take the form, for example, of the fan structure disclosed in U.S. patent application Ser. No. 09/528,168, filed Mar. 17, 2000. Various hydraulic hoses, pipes, valves, and related structures are not shown in the figures for reasons of clarity.

A debris container 30 is mounted rearwardly of the power unit 28 and is designed to receive and accumulate debris that is aspirated or swept from the roadway surface. The debris container 30 typically includes an inlet (not shown) into which the debris-laden air is conducted into the container and an outlet (not shown) through which the air flow is returned in an air flow recirculation loop as is known in the art. Air handling ducts, 32 and 34, interconnect the power unit 28 with the debris container 30 as is also known in the art. The debris-laden air, as it enters the internal volume of the debris container 30, experiences a decrease in its air velocity so that the entrained particles "drop-out" of the air flow and are collected in the debris container 30. The air flow within and through the debris container 30 can be directed through various baffles and/or screens to maximize the probability the debris will be collected in the debris container 30. The sweeper 20 also includes a pair of rear-mounted hydraulic stabilizer jacks 36 (best shown in FIG. 2) that can be extended to engage the ground surface to stabilize the sweeper 20 during the dump cycle described below. A sign board 38 (shown in dotted line illustration in FIG. 1) is provided at the rear end of the truck chassis and carries various operator-controllable warning lights and directional arrows.

Figure 3:
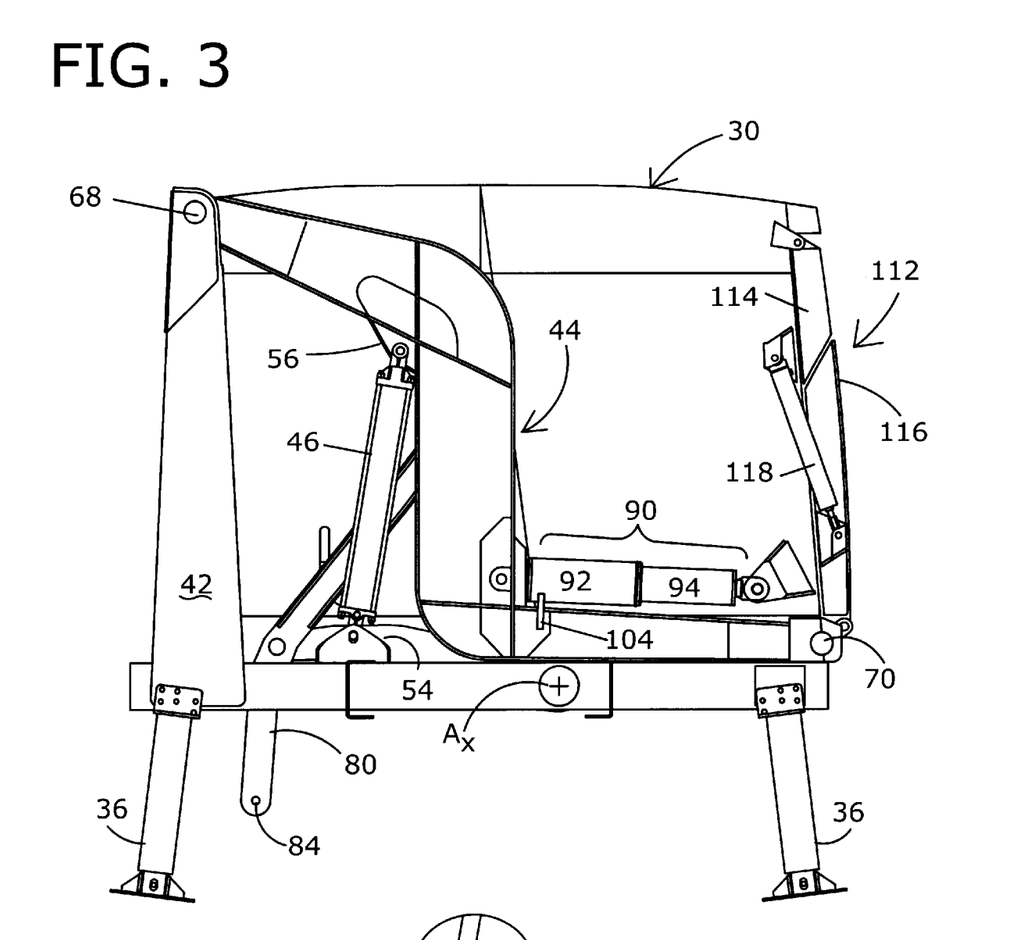
FIG. 3 show the basic structural components of the high-dump system in the cradled position.
Figure 4:
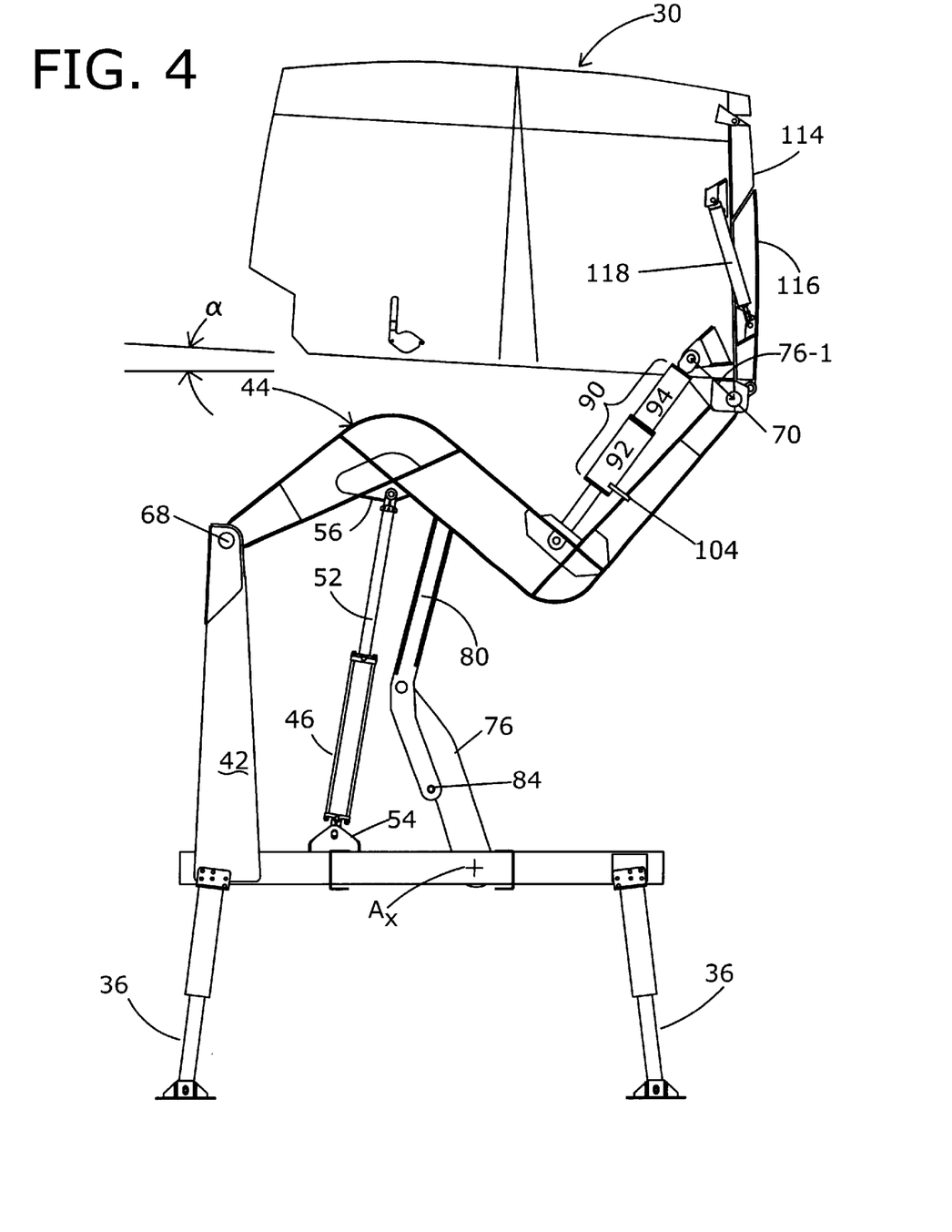
FIG. 4 shows the basic structural components of the high-dump system in the lifted, pre-tilt position.
Figure 5:
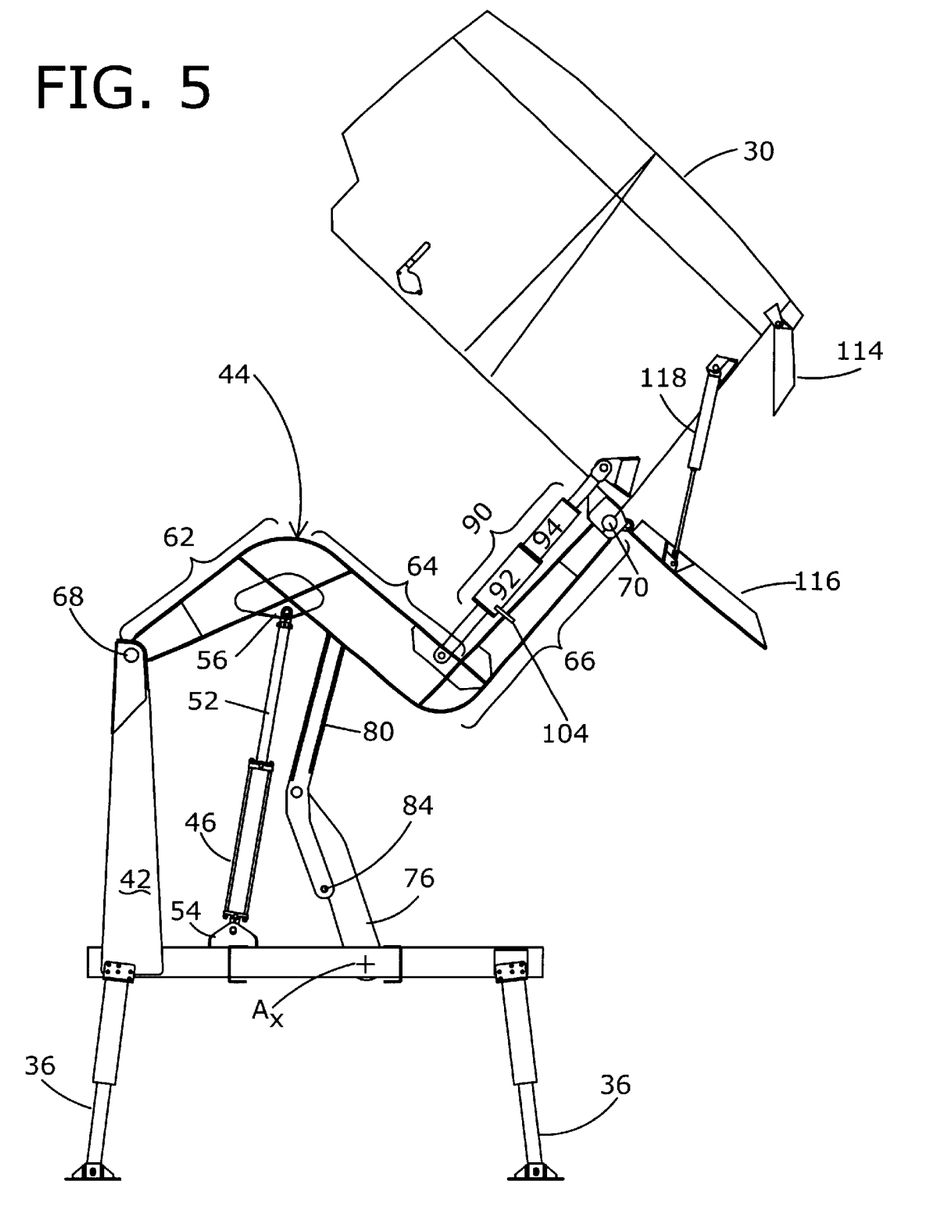
FIG. 5 shows the basic structural components of the high-dump system in the lifted and tilted "dump" position.
Figure 6:
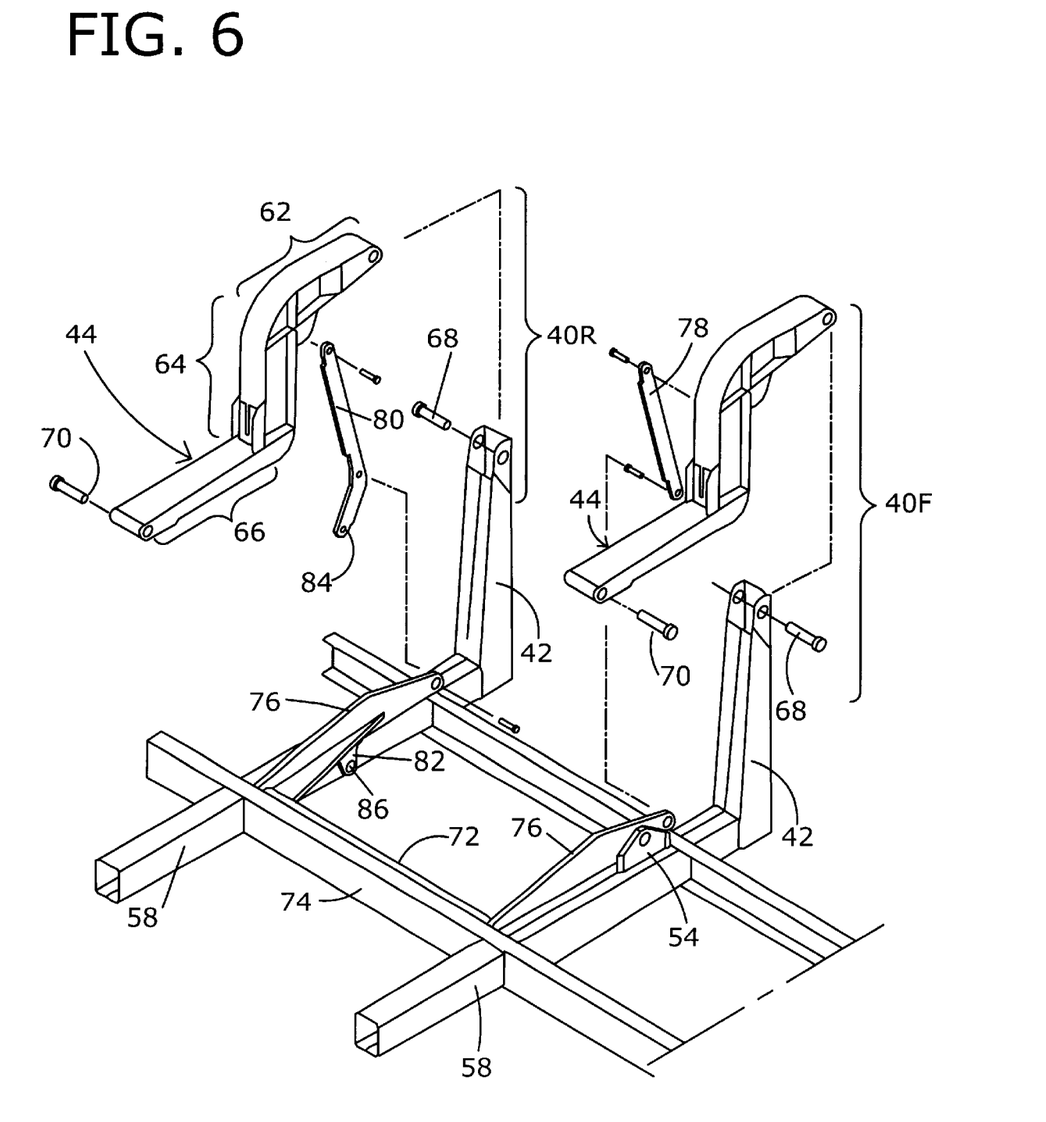
FIG. 6 presents the basic structural members of the lift assembly in exploded isometric view when the system is in the cradled position of FIG. 3.

FIGS. 2 and 3 illustrate the main structural components of the dump system in its home or 'cradled' position, FIG. 4 illustrates the same components in the lifted position just prior to the tilting of the debris container 30, and FIG. 5 illustrates the same components in the lifted/tilted position during which debris is off-loaded from the sweeper 20. FIG. 6 shows only the main structural components of the lift system in the 'cradled' position, and FIG. 7 shows selected components of a torque control system and manual safety stop arrangement in the lifted configuration.

As shown in the side view of FIG. 1, the lift system includes a pair of lift assemblies; one lift assembly 40R is positioned on the rearward side of the debris container 30 and the other lift assembly 40F is positioned on the foward side of the debris container 30. Each lift assembly, 40R and 40F, includes three main structural components: a vertically extending tower or upright 42, a lift arm 44 that is pivoted at one end to the upper end of its respective upright 42, and a single-ended, double-acting hydraulic lift cylinder 46 that functions to raise and lower the lift arm 44 about its pivoted connection with its upright 42. FIG. 6 shows the upright 42 and the lift arm 44 of the rearward lift assembly 40R on the left and the upright 42 and the lift arm 44 of the forward lift assembly 40F on the right. (The lift cylinders 46 and the debris container 30 are not shown in FIG. 6 for reasons of clarity.) The lift cylinder 46 for the rearward lift assembly 40R is shown in FIGS. 3–5; the operation of lift cylinders 46 is discussed below.

Figure 7:
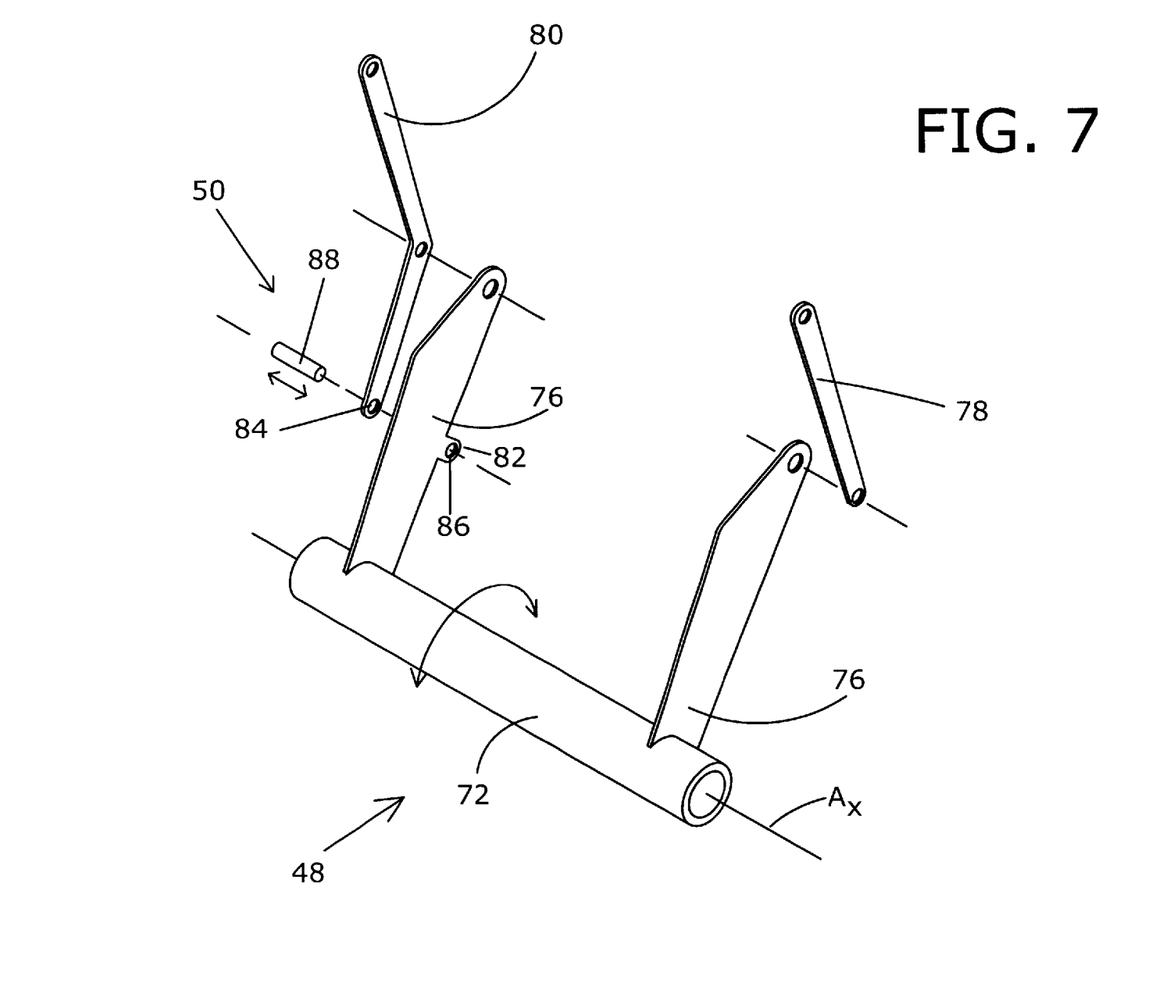
FIG. 7 is an isometric detail of a torque control system and integrated manual safety stop arrangement.

As shown in FIG. 7, the lift system also includes a torque control mechanism 48 that minimizes mis-phasing between the lift cylinders 46 of the two lift assemblies 40R and 40F, and a manual safety stop mechanism 50 by which the operator can lock the debris container 30 in its lifted position.

Figure 3A:
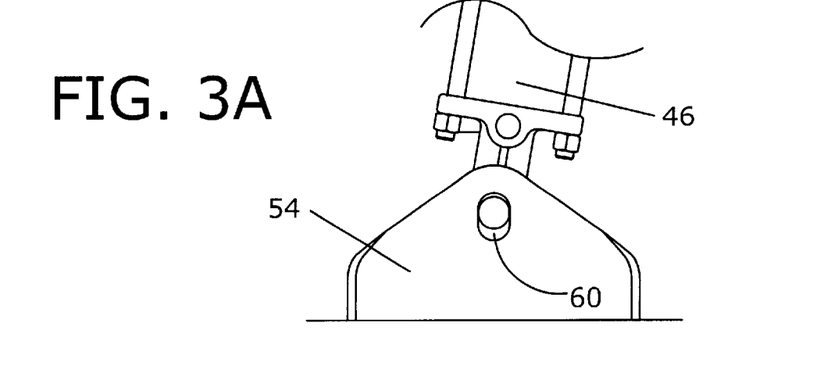
FIG. 3A illustrates the connection between a mounting bracket and a hydraulic lift cylinder.

As best shown in FIGS. 4 and 5, each lift cylinder 46 includes an actuator rod 52 and is connected, at its lower base end, to an anchor bracket 54 by a pinned connection and, at the end of their respective actuator rod 52, to an attachment bracket 56 on the lift arm 44. The anchor bracket 54 (best shown in FIG. 6) is secured to a lateral cross-member 58 of the the truck frame 24, for example, by welding. As shown in the detail of FIG. 3A, a pin-accepting hole 60 in each anchor bracket 54 is formed as an elongated hole or slot that will allow self-seating of the connecting pin (unnumbered) of each lift cylinder 46 to accommodate accumulated clearances and dimensional changes in the structural components.

Each upright 42 is fabricated as a weldment and is welded to a lateral cross-member 58 of the truck frame 24. In general, each upright 42 has a vertical height about equal to the vertical height of the debris container 30. As explained below, the vertical height of the uprights 42 can be made more or less than that of the debris container 30 to adjust the lateral 'swing-out' of the debris container 30 during the lift and dump cycle.

Each lift arm 44 is also fabricated as a weldment and has (FIG. 5) a first section 62, a second section 64, and a third section 66. The first section 62 and the third section 66 are approximately parallel to each other while the second section 64 joins the first and third section, 62 and 66, to give each lift arm 44 a S-like or Z-like profile. The end of the first section 62 is pivotally connected to its respective upright 42 via a pivot pin 68, as best shown in FIGS. 5 and 6. The opposite end of each lift arm 44 is pivotally connected to the debris container 30 via a similar pivot mounting using a pivot pin 70, as shown in FIG. 6 and in FIGS. 3, 4, and 5. In the preferred embodiment, the actuator rod 52 of the lift cylinder 46 is connected to the attachment bracket 56 at the transition between the first and second sections, 62 and 64, of its respective lift arm 44.

The torque control mechanism 48 is designed to prevent or minimize mis-phasing between the hydraulic lift cylinders 46 that operate the lift arms 44 and can be best seen in FIGS. 6 and 7. As shown, a torsion bar 72 is aligned along one of the longitudinal members 74 of the truck frame 24 between two lateral cross-members 58. While not specifically shown, the torsion bar 72 is journalled in the cross-members 58 for limited rotary motion about an axis $A_x$ as indicated by the arrow in FIG. 7. A torque arm 76 is welded at its base adjacent each end of the torsion bar 72; both torque arms 76 extend substantially parallel to one another. A connecting link is associated with each torque arm 76; as shown in FIG. 7, a connecting link 78 is pivotally connected to the torque arm 76 at one end, and another, longer connecting link 80 is pivotally connected at a mid-point thereof to the end of the other torque arm 76. The opposite ends of the connecting links 78 and 80 are pivotally connected to their respective lift arms 44 through appropriate pivot fasteners (unnumbered) as shown in FIG. 6. The torque control mechanism 48 functions to interconnect or couple both lift arms 44 throughout their range of motion. As explained below, the torque control mechanism 48 functions to prevent undesired twisting or torquing of the debris container 30 in the event one lift cylinder 46 leads or lags the other or is otherwise mis-phased during the operating cycle. In the preferred embodiment, the torsion bar 72 is fabricated from a six-inch diameter steel tube having a wall thickness in the one-half inch range. Preferably, the tube is drawn over a mandrel from hot rolled steel to assure roundness and dimensional accuracy. In practice, it is expected that the distal ends of the torque arms 76 will undergo a displacement relative to each other of about one-eighth of an inch in normal operation.

The manual safety stop mechanism 50 is integrated into the torque control mechanism 48 and, as shown on the left side of FIG. 7, is defined by the lower extension of the connecting link 80 and an apertured boss or tab 82 that extends from the rear torque arm 76. When the lift assembly 40 is in its lifted position, a hole 84 in the lower extension of the connecting link 80 is co-aligned with a hole 86 in the tab 82 of the rear torque arm 76 so that an operator can insert a locking pin 88. When locked by the manual safety stop mechanism 50, the lift assembly 40 and the debris container 30 are effectively locked or secured in the lifted position so that an operator can, for example, inspect the structural components with an assurance of safety.

As best shown in FIGS. 3, 4, and 5, the attitude of the debris container 30 relative to the local horizontal is controlled by a tandem cylinder-set 90 that is carried on the third section 66 of each lift arm 44. Each tandem cylinder-set 90 is defined by an attidue-control hydraulic cylinder 92 and a tilt-control hydraulic cylinder 94 mounted in a base-to-base configuration. The attitude-control hydraulic cylinder 92 is a single-ended, double-acting cylinder designed to maintain the debris container 30 in a horizontal or near horizontal alignment as the lift system is operated between the 'cradled' position (FIGS. 2 and 3) and the lifted position (FIG. 4). The tilt-control hydraulic cylinder 94 is a single-ended, double-acting cylinder designed to allow operator-controlled tilting of the debris container 30 in the clockwise direction about its pivot point 70 with the lift arm 44 to dump the contents of the debris container 30.

Figure 8:
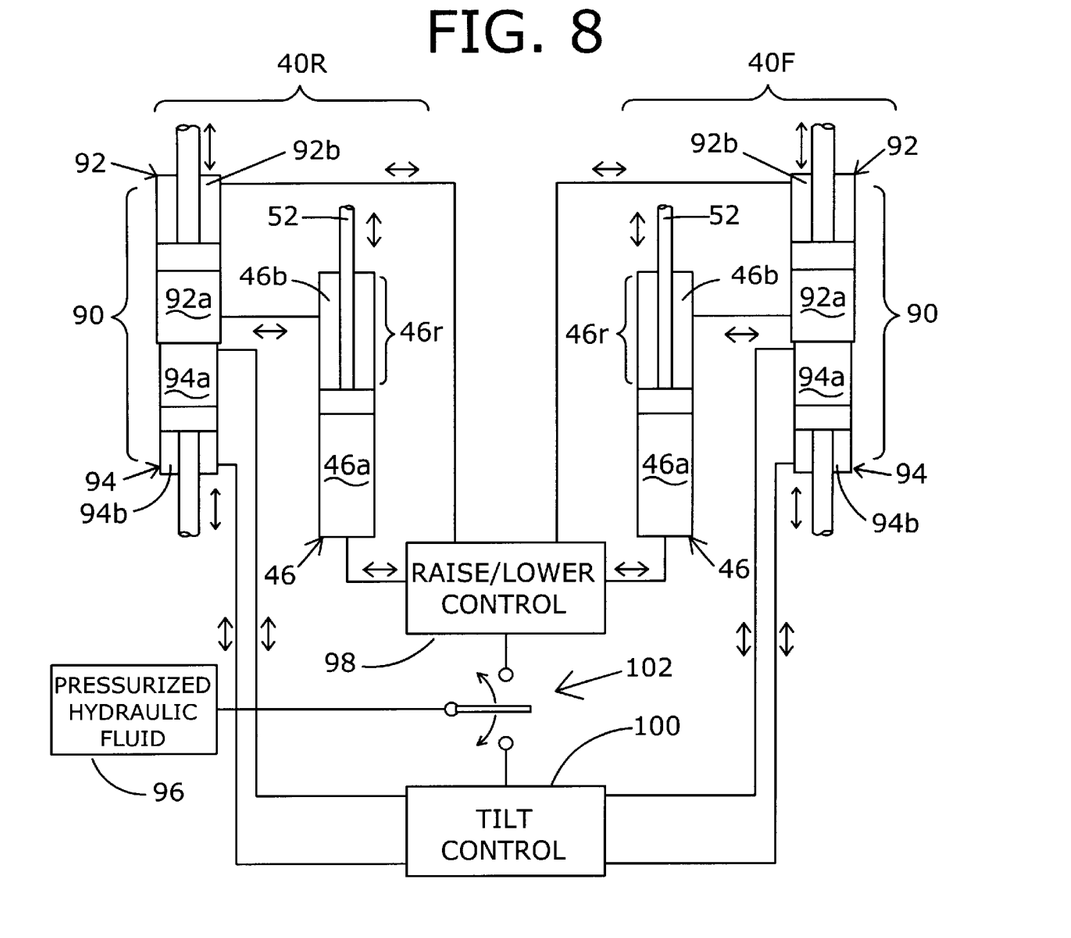
FIG. 8 is a hydraulic circuit that controls the high-dump system throughout its operating cycle.

FIG. 8 is a diagram of the hydraulic system for controlling the various hydraulic cylinders during the lift-and-tilt operating cycle in which the hydraulic cylinders and related conduits on the left side of the figure function with the rear lift assembly 40R, and the hydraulic cylinders and related conduits on the right side of the figure function with the forward lift assembly 40F.

As shown, the hydraulic system includes a source of pressurized fluid 96, a raise/lower control 98, a tilt control 100, and a selector 102 by which pressurized fluid can be routed to the raise/lower control 98 or the tilt control 100.

As shown, each lift cylinder 46 includes a first working chamber 46a at its base end that connects directly to the raise/lower control 98 to allow the lift cylinders 46 to lift and lower their respective lift arms 44 and the connected debris container 30. Each lift cylinder 46 also includes a second working chamber 46b on its rod end 46r. The hydraulic cylinders 92 and 94 of the tandem cylinder-set 90 have similarly defined working chambers, i.e., the attitude-control hydraulic cylinder 92 has a working chamber 92a at its base end and another working chamber 92b on its rod end (unnumbered), and the tilt-control hydraulic cylinder 94 has a working chamber 94a at its base end and another working chamber 94b on its rod end (unnumbered).

The working chamber 46b of the lift cylinder 46 is connected to the working chamber 92a of the attitude-control hydraulic cylinder 92, and the working chamber 92b at the rod end of the hydraulic cylinder 92 is connected to the raise/lower control 98. The volume within the working chamber 46b defined in the rod end 46r of each lift cylinder 46 and the connection point between the actuator rod (unnumbered) of the attitude-control hydraulic cylinder 92 with the debris container 30 are preselected so that the volume of fluid driven from working chamber 46b on the rod end 46r of its lift cylinder 46, when the lift cylinder 46 is expanding during the lift cycle, will cause an expansion of the connected attitude-control hydraulic cylinder 92 sufficient to rotate (i.e., clockwise) the debris container 30 about its pivot point 70 with the lift arm 44 to hold the debris container 30 in a horizontal or near horizontal attitude as it is lifted during the lift cycle. In the preferred embodiment, the volume of the working chamber 92a of the attitude-control cylinder 92 and the related design parameters are selected so that the volume of hydraulic fluid driven from the working chamber 46b at the rod end 46r of the connected lift cylinder 46 during the lift cycle will cause the debris container 30 to be tilted by some angle α from the horizontal (i.e., about three degrees, as shown in FIG. 4) when the debris container 30 is in its fully lifted, pre-tilted position. The use of a known volume of hydraulic fluid driven to and from the rod end 46r of the lift cylinders 46 into the base ends of their respective attitude-control cylinders 92 of the respective tandem cylinder-sets 90 allows for the relatively automatic control of the attitude of the debris container 30 during the entire lift-and-tilt cycle without the need for operator intervention or complicated controls. The connection between the working chamber 92b of the attitude-control hydraulic cylinder 92 and the raise/lower control 98 allows for pressurized hydraulic fluid in the working chamber 92b to move to and from the raise/lower control 98 as the debris container 30 is raised and lowered.

The tilt-control cylinder 94 of each tandem cylinder-set 90 likewise includes a working chamber 94a at its base end and another working chamber 94b on the rod end (unnumbered) thereof. The working chambers 94a and 94b are connected via respective conduits (unnumbered) to the tilt control 100 so that the operator can tilt the debris container 30 to and from its horizontal or near horizontal position to its tilted and "dump" position as shown in FIG. 4.

Figure 9:
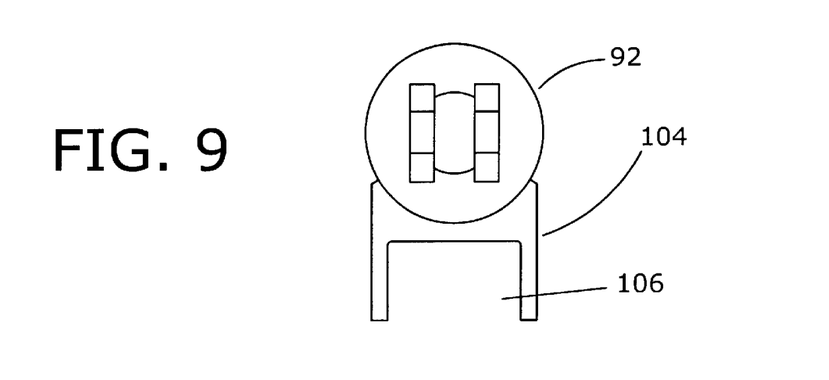
FIG. 9 is a plan view of a guide shoe that prevents rotary mis-alignment of a hydraulic cylinder.

Each tandem cylinder-set 90 is provided with a guide shoe 104, shown in FIG. 9, that is secured (in the preferred embodiment) to the attitude-control hydraulic cylinder 92 and which includes a slot-like configuration 106 that engages the opposite lateral sides of the respective lift arm 44. The guide shoe 104 minimizes possible twisting or torquing of the tandem cylinder-set 90 during operation.

Figure 10:
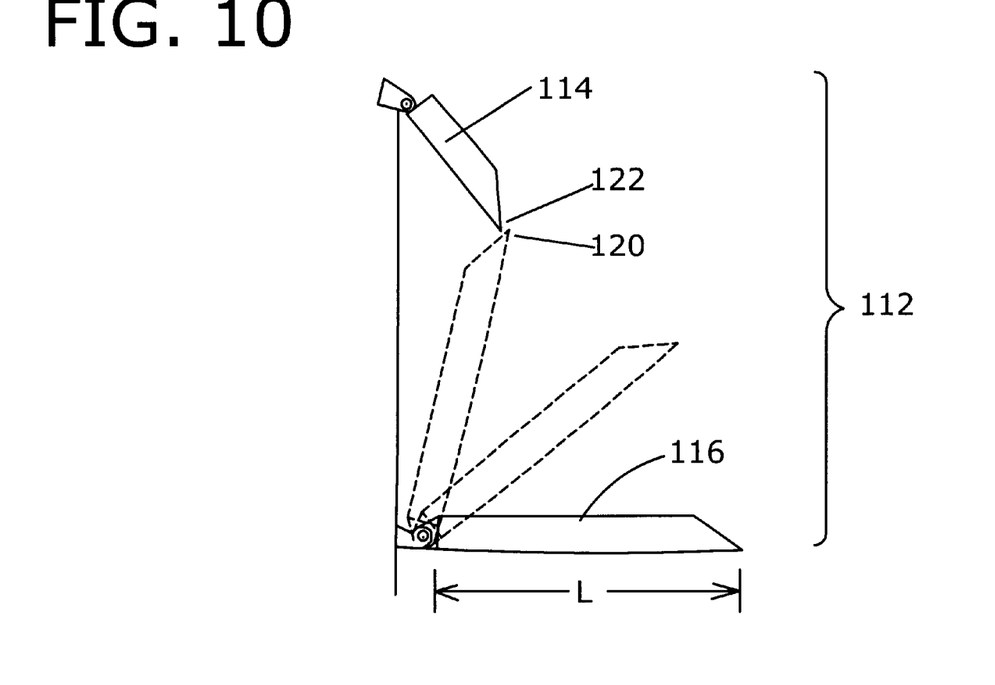
FIG. 10 is a side view of the hydraulically controlled bi-doors of the high-dump system.
Figure 11:
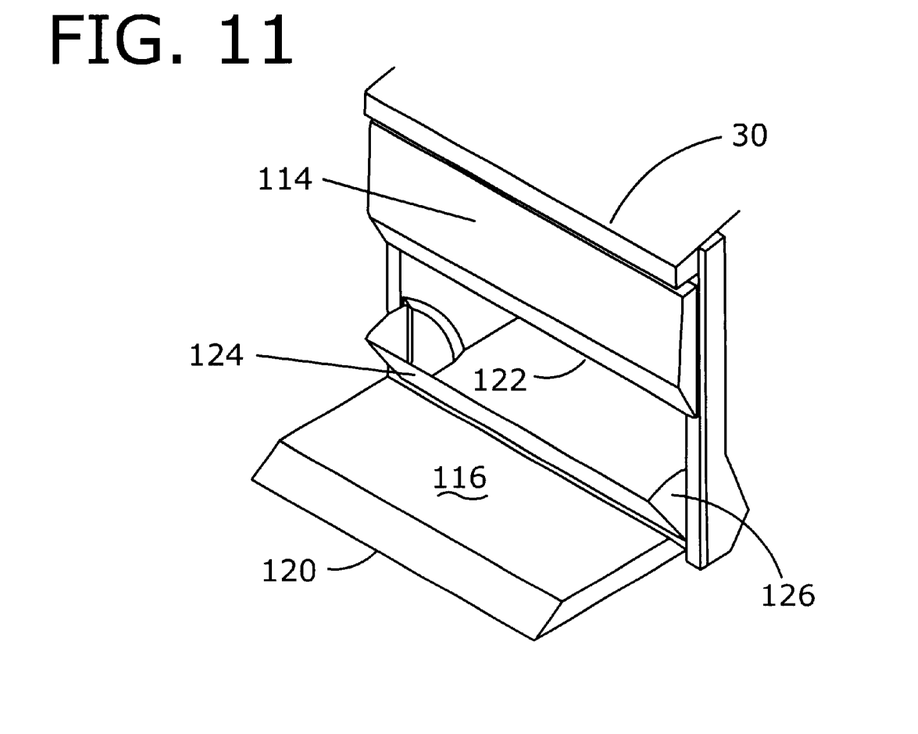
FIG. 11 is a perspective view of the bi-door assembly of the debris container and an off-loading chute.

As shown in FIG. 10, the debris container 30 includes a hydraulically controlled bi-door arrangement 112 through which the debris container 30 is emptied. As shown in FIGS. 4, 10, and 11, the upper door 114 and the lower door 116 are hinged along spaced parallel axes and have a 'mitered' end by which both door ends are formed at a complementary 'ramp' angle. As the lower door 116 is closed under the control of its door-control cylinder 118, the distal edge 120 of the lower door 116 'catches' the complementary distal edge 122 of the upper door 114 to force the upper door 114 to close as the lower door 116 is also closed. The opened lower door 116 forms an inclined surface that guides the off-loading debris into a dump truck parked adjacent the sweeper 20. In general, the length "L" of the lower door 116 is selected to insure that the debris will transfer into the bed of the dump truck and is also selected so that the distal end of the lower door 116 will not contact or interfere with the off-loaded debris when the dump truck is fully loaded. In practice, the lower door 116 has an effective length "L" that is about three times the length of the upper door 114.

As shown in FIG. 11, the debris container 30 is also provided with a fold-out sheet-metal 'chute' 124 that bridges the gap at the edge of the lower door 116 where the lower door 116 is hinged to the debris container 30; the fold-out 'chute' 124 functions to minimize spillage. The chute 124 also includes side panels or wings 126 that prevent spillage over the side of the lower door 116 as the debris slides downwardly along the lower door 116 and into the bed of the dump truck.

The high-dump system is best suited for highway sweeping operations in which a sweeper 20 is moved along a roadway adjacent, for example, to a concrete highway divider while sweeping debris from the roadway. In time, the debris container 30 will fill with debris and require off-loading. A dump truck will pull-up to the side of the sweeper 20 and park in a side-to-side relationship with the sweeper 20 spaced about one to two feet from the side of the dump truck. In the alternative, the sweeper 20 can pull-up to a stationary dump truck or dumpster-type receptacle. Once the sweeper 20 and the dump truck are positioned in their side-to-side relationship, the retractable stabilizer jacks 36 (FIG. 2) at the rear end of the sweeper 20 are extended in a ground-engaging relationship to stabilize the vehicle during the lift/tilt/dump cycle.

The lift cylinders 46 are then pressurized by routing the pressurized hydraulic fluid through the selector 102 to begin rotating the lift arms 44 (counterclockwise in FIG. 3) about their pivot pin 68 connections to their respective upright 42. As the lift arms 44 are moved, the hydraulic fluid in working chamber 46b at the rod end 46r of each lift cylinder 46 is transferred by appropriate conduits to the working chamber 92a at the base end of the attitude-control hydraulic cylinder 92 of the tandem cylinder-set 90. The attitude-control hydraulic cylinder 92, in response to the pressurized fluid provided from working chamber 46b at the rod end 46r of the now expanding lift cylinder 46, pushes against its anchor point on the second section 64 of the lift arm 44 to cause the debris container 30 to rotate (clockwise in FIG. 4). The volume of fluid provided from the working chamber 46b at the rod end 46r of the lift cylinder 46, the capacity/stroke of the working chamber 92a of the attitude-control hydraulic cylinder 92, and the torque arm distance 76-1 (FIG. 4) between the anchor point of the tandem cylinder-set 90 and the pivot point connection 70 to the debris container 30 are calculated to hold the debris container 30 substantially horizontal or slightly tilted in the clockwise direction as the debris container 30 is raised to its lifted position. In the preferred embodiment, the debris container 30 is tilted at an angle $\alpha$ of about three degrees when in its raised position.

The purpose of holding the debris container 30 horizontal or near horizontal during the lift operation is to prevent or minimize any side-to-side shifting of the debris contained within the debris container 30 during the lift sequence; a sudden shift in the debris during the lift-and-tilt cycle could cause an undesired momentary instability. Additionally, in a situation where the debris container 30 is lifted with the door end higher than the other end, debris could accumulate at the end of the debris container 30 opposite the door end and place an unnecessarily increased torque load on the container tilting components.

Once the debris container 30 is brought to its lifted position (FIG. 4), the tilt-control cylinder 94 of each tandem cylinder-set 90 is pressurized to rotate the now raised debris container 30 (clockwise in FIG. 5) about the pivoted connections with the end of each lift arm 44 until the debris container 30 is tilted about 40–50 degrees from the horizontal. At that point, the lower door 116 of the bi-door set 112 is opened by the door control cylinder 118 to deploy the winged chute 124 and allow the debris to slide downwardly and into the waiting dump truck or other debris receptacle.

In the event that the operator must walk beneath the lifted debris container 30 for any reason, the structural components can be locked in the raised position by inserting the lock pin 88 (FIG. 7) into the manual safety stop mechanism 50 to lock the structural components in place.

Once the debris container 30 is emptied, the above described cycle is reversed and the now-empty container returned to its cradled position.

As the debris container 30 is moved from its cradled position to its raised position, the door end of the debris container 30 will swing-out of the lateral edge of the sweeper 20 and effectively displace the debris container 30 laterally. The amount of lateral swing-out is controlled by the location of the pivot on each upright 42 and the equivalent length of each lift arm 44. The swing radius can be increased, for example, by increasing the height of the upright 42 and/or the equivalent length of each lift arm 44 to thereby increase the swing-out distance. Conversely, the swing-out distance can be decreased by shortening the vertical height of the uprights 42 and/or the equivalent length of the lift arms 44. Additionally, the geometry of the movement of the debris container 30 can also be controlled by moving the lateral position of the uprights 42 on the truck frame 24. In general, a swing-out distance of at least one foot and in the one to two foot range is considered acceptable.

In the preferred embodiment, the lift arms 44 are shown as having a S- or Z-shape; as can be appreciated, other shapes, including a linear or a curvilinear lift arm can be used.

As will be apparent to those skilled in the art, various changes and modifications may be made to the illustrated high-lift lateral dump system for pavement/street sweepers of the present invention without departing from the spirit and scope of the invention as determined in the appended claims and their legal equivalent.

What is claimed is:

1. A dump system for pavement/street sweepers of the type having a frame upon which the dump system components are mounted, comprising:
   a debris container for receiving debris;
   a first and a second lift assembly for lifting the debris container between a lowered position and a lifted position;
   each lift assembly including an upright secured to the frame and extending thereabove, a lift arm pivotally connected to the debris container and also pivotally connected to its respective upright for relative pivotal motion between a lowered position and a lifted position, a fluid-actuated lift cylinder connected to the lift arm to move the lift arm and the connected debris container between the lowered and the lifted positions;
   a tilt-control fluid-actuated cylinder connected for rotating the debris container about its pivotal connection with the lift arm to an inclined attitude sufficient to dump debris from the debris container when the debris container is in its lifted position, and
   a fluid-actuated attitude-control cylinder connected between said lift arm and said debris container to maintain the debris container in a selected attitude while moved from at least the lowered position to the lifted position.

2. The dump system for pavement/street sweepers of claim 1, wherein each of said lift arms has a one of said tilt-control fluid-actuated cylinders connected between the respective lift arm and the debris container.

3. The dump system for pavement/street sweepers of claim 1, further comprising:
   meant for locking said lift assembly in a lifted position.

4. The dump system for pavement/street sweepers of claim 1, wherein the attitude-control fluid-actuated cylinder is in fluid communication with its lift cylinder and receives a flow of pressurized fluid from said lift cylinder when said lift cylinder is moving said lift arm from said lowered position to said lifted position, said attitude-control fluid-actuated cylinder maintaining said debris container in a substantially horizontal attitude while lifted from at least the lowered position to the lifted position.

5. The dump system for pavement/street sweepers of claim 1, wherein said debris container includes first and second doors and a fluid-actuated door-control cylinder that selectively opens and closes the second door.

6. The dump system for pavement/street sweepers of claim 5, wherein said second door, when moved to its closed position by said door-control cylinder, causes said first door to also close.

7. The dump system for pavement/street sweepers of claim 1, further comprising means connecting each of said lift arms to one another for controlling torque throughout a lift cycle.

8. The dump system for pavement/street sweepers of claim 1, further comprising a torque control system having:
   a torsion member mounted for rotary motion about a torsion member axis,
   a first torque arm and a second torque arm secured to said torsion member and axially spaced apart from one another therealong;
   a first linkage connecting said first torque arm to said first lift arm; and
   a second linkage connecting said second torque arm to said second lift arm.

9. The dump system for pavement/street sweepers of claim 8, wherein at least one of said first or second linkages has a lock-pin receiving hole formed therein and its associated torque arm has a lock-pin receiving hole formed therein, said first-mentioned and said second-mentioned lock-pin receiving holes co-aligned with one another when said lift assembly is in its lifted position; and
   a lock pin insertable in said co-aligned first-mentioned and said second-mentioned lock-pin receiving holes.

10. A dump system for pavement/street sweepers of the type having a frame upon which the dump system components are mounted, comprising:
   a debris container for receiving debris;
   a first and a second lift assembly for lifting the debris container between a lowered position and a lifted position;
   each lift assembly including an upright secured to the frame and extending thereabove, a lift arm pivotally connected to the debris container and also pivotally connected to its respective upright for relative pivotal motion between a lowered position and a lifted position, a fluid-actuated lift cylinder connected to the lift arm to move the lift arm and the connected debris container between the lowered and the lifted positions, and a tandem fluid-actuated cylinder set connected between the lift arm and the debris container for maintaining the debris container in a horizontal or near horizontal attitude as the debris container is lifted from the lowered to the lifted position and for selectively rotating the debris container about its pivotal connection with the lift arm to an inclined attitude sufficient to dump debris from the debris container when the debris container is in its lifted position.

11. The dump system for pavement/street sweepers of claim 10, wherein each of said tandem fluid-actuated cylinder sets include an attitude-control fluid-actuated cylinder to maintain the debris container in a substantially horizontal position when lifted from at least the lowered position to the lifted position and a tilt-control fluid-actuated cylinder to selectively tilt the debris container to effect dumping of debris therefrom.

12. The dump system for pavement/street sweepers of claim 11, wherein the attitude-control fluid-actuated cylinder is in fluid communication with its lift cylinder and receives a flow of pressurized fluid from said lift cylinder when, said lift cylinder is moving said lift arm from said lowered position to said lifted position, the flow of pressurized fluid sufficient to maintain the debris container in a substantially horizontal attitude during lifting.

13. The dump system for pavement/street sweepers of claim 11, wherein each of said lift cylinders is a double-acting hydraulic cylinder and has a cylinder end working chamber defined on one side of its operating piston and a rod-end working chamber on the other side of its operating piston, the rod-end working cylinder in fluid communication with said attitude-control fluid-actuated cylinder of said tandem cylinder set to maintain said debris container in a substantially horizontal or near horizontal attitude as said container is lifted from its lowered to its lifted position.

14. The dump system for pavement/street sweepers of claim 10, wherein said debris container includes first and second doors and a fluid-actuated door-control cylinder that selectively opens and closes the second door.

15. The dump system for pavement/street sweepers of claim 14, wherein said second door, when moved to its closed position by said door-control cylinder, causes said first door to also close.

16. The dump system for pavement/street sweepers of claim 10, further comprising a torque control means connecting each of said lift arms to one another throughout a lift cycle.

17. The dump system for pavement/street sweepers of claim 10, further comprising a torque control system connecting each of said lift arms to one another throughout a lift cycle and having:
   a torsion member mounted for rotary motion about a torsion member axis,
   a first torque arm and a second torque arm secured to said torsion member and axially spaced apart from one another therealong;
   a first linkage connecting said first torque arm to said first lift arm; and
   a second linkage connecting said second torque arm to said second life arm.

18. The dump system for pavement/street sweepers of claim 10, further comprising:
   means for locking said lift assembly in a lifted position.

19. The dump system for pavement/street sweepers of claim 17, wherein at least one of said first or second linkages has a lock-pin receiving hole formed therein and its associated torque arm has a lock-pin receiving hole formed therein, said first-mentioned and said second-mentioned lock-pin receiving holes co-aligned with one another when said lift assembly is in its lifted position; and
   a lock pin insertable in said co-aligned first-mentioned and said second-mentioned lock-pin receiving holes.

* * * * *